UNITED STATES PATENT OFFICE.

CHARLES R. LONG, JOHN S. MILLER, AND WILLIAM F. INGRAM, OF LOUISVILLE, KENTUCKY.

COMPOSITION OF MATTER FOR STREET-PAVING OR OTHER PURPOSES.

SPECIFICATION forming part of Letters Patent No. 673,275, dated April 30, 1901.

Application filed February 28, 1900. Serial No. 6,791. (No specimens.)

*To all whom it may concern:*

Be it known that we, CHARLES R. LONG, JOHN S. MILLER, and WILLIAM F. INGRAM, citizens of the United States, residing at Louisville, in the county of Jefferson and State of Kentucky, have invented certain new and useful Improvements in Compositions of Matter for Street-Paving or other Purposes; and we do declare the following to be a full, clear, and exact description of the invention, such as will enable others skilled in the art to which it appertains to make and use the same.

This invention has relation to compositions for paving, roofing, and analogous purposes; but it has more especial reference to materials or compositions for incorporation with natural sandstone asphalt-rock or bituminous sandstone to harden the same and render it practical for use as a pavement, driveway, floor, sidewalk, roof, conduit, or any other purpose to which asphalt is applicable or for which it is used.

As is well known, there are in many sections of this country large bodies of sandstone asphalt-rock, the use of which for paving and analogous purposes in lieu of Trinidad or other asphalts similar to the Trinidad has frequently been suggested. The sandstone rock-asphalts, however, have not been successfully developed to compete with the other asphalts, notwithstanding the reduction in the expense of procuring the former, due to its accessibility and quantity, largely because it has been deemed necessary to mix it with other expensive limestone asphalt-rock to adapt it to street-paving, roofing, and other purposes for which asphalt is commonly used.

The primary object of this invention is to provide a material or composition for use with natural sandstone asphalt-rock or other natural asphalts which will render unnecessary the use of expensive limestone asphalt-rock, will be inexpensive, and will impart a degree of hardness and durability to natural sandstone asphalt-rock or other natural asphalt equal to that possessed by other more expensive asphalts; and to this end the invention consists in the combinations of ingredients hereinafter described, and particularly pointed out in the subjoined claims.

We have discovered and by thorough practical tests have proved that a mixture consisting of a magnesian mineral, such as natural steatite or talc, serpentine, terra-alba, and ozocerite, each of which materials is found in large quantities in this country and is inexpensive, has peculiar qualities in giving to sandstone asphalt-rock or other asphalt requiring hardening material to be incorporated therewith the hardness and water-resisting and climate-resisting properties requisite in respect of a thoroughly satisfactory and durable pavement, sidewalk, floor, roof, or conduit and that the composition composed of natural sandstone asphalt-rock and the hardening mixture described is equal in every respect to and is cheaper than other asphalts. While the best results, especially for street-paving and certain other purposes, are obtained from the use of all the ingredients mentioned, yet we do not wish to be understood as limiting ourselves in all respects to a combination of all of said ingredients, nor do we wish to be understood as limiting ourselves to the specific ingredients mentioned, as others having similar properties may be substituted without departing from the spirit of the invention.

Each of the ingredients hereinabove mentioned will to a limited degree harden sandstone asphalt; but the result of the use of either alone is greatly inferior to that flowing from a combination of all of said ingredients. According to our experiments the steatite and talc or steatite or talc assimilates by proper preparation and mixing with sandstone asphalt and imparts a degree of hardness thereto and enables the same to resist the effects of heat and cold. Serpentine aids in setting the composition and gives increased hardness thereto. Terra-alba combines with sandstone asphalt and the other ingredients of the hardening material and imparts cementing power to all, while ozocerite adds toughness and cohesiveness.

The proportions of the ingredients will depend upon the particular purpose for which the composition is to be used and upon climatic and similar conditions to which it will be subjected and also to the character of the asphalt sandstone to be treated. In general it may be stated that if the composition is to be used in a place subject to high temperature and frequent rains or to either of such climatic peculiarities the proportion of the hardening mixture to the asphalt-rock will be greater than is required when the composition is to be used in a place having a colder or drier climate. For example, for street-paving purposes for a place having a climate similar to that in the city of Louisville and considering two different deposits of sandstone asphalt one of which is harder than the other and has a much finer quality of sand and a lesser percentage of bitumen, with said harder sandstone we prefer to use approximately three and one-half per cent. of steatite or talc, three and one-half per cent. of terra-alba, one and one-half per-cent. of serpentine, and one and one-half per cent. of ozocerite to ninety per cent. of sandstone asphalt. With said other sandstone asphalt we have produced the best result by using with eighty-seven per cent. of the asphalt five per cent. of steatite or talc, five per cent. of terra-alba, one and one-half per cent. of serpentine, and one and one-half per cent. of ozocerite. The quantity of bitumen and the character of the sand in the rock-asphalt, as well as the climatic conditions to which the material is to be subjected, will determine the proportions of the ingredients of the hardening composition, and for this reason we wish it understood that the above proportions are given merely as examples and that the invention is not limited to any specific proportions of the ingredients forming the hardening mixture.

We deem it desirable, although not wholly necessary, to add to the hardening combination above mentioned approximately two per cent. of "lake-pitch asphalt" or "Trinidad" asphalt and to correspondingly reduce the proportion of sandstone asphalt in the complete paving composition, as we have found that by said addition a tougher product results.

Preparatory to incorporating the hardening mixture with the asphalt-rock all the materials are separately crushed to a fine mass and the ingredients of the hardening mixture are mechanically and thoroughly mixed. This hardening mixture is then thoroughly incorporated with the crushed asphalt-rock and thereafter when ready for use is artificially heated sufficient to melt the materials and until the mass is homogeneous throughout. The material or composition thus produced is laid or applied under a proper degree of heat and is compacted by ramming, tamping, or rolling it.

Having thus described the invention, what we believe to be new, and desire to secure by Letters Patent, is—

1. The herein-described hardening composition for incorporation with natural rock-asphalt, or other natural asphalt requiring the incorporation of a hardening material therewith, said hardening composition having, in combination, a magnesian mineral and terra-alba.

2. The herein-described hardening composition for incorporation with natural rock-asphalt, or other natural asphalt requiring the incorporation of a hardening material therewith, said hardening composition having, in combination, steatite or talc, serpentine and terra-alba.

3. An asphalt composition for street-paving and analogous purposes, having, in combination with sandstone asphalt-rock or bituminous sandstone, which forms the principal ingredient of the composition, a hardener therefor embracing a magnesian mineral and a cementing material, substantially as described.

4. A composition for street-paving and analogous purposes, having, in combination, natural sandstone asphalt-rock, or other natural asphalt, a magnesian mineral, and terra-alba.

5. A paving composition, having, in combination, natural sandstone asphalt-rock, or other natural asphalt, steatite or talc, serpentine, and terra-alba.

6. The herein-described hardening composition for incorporation with natural rock-asphalt, or other natural asphalt requiring the incorporation of a hardening material therewith, said hardening compositions having a magnesian mineral or minerals, terra-alba, and ozocerite.

7. The herein-described hardening composition for incorporation with natural rock-asphalt, or other natural asphalt requiring the incorporation of a hardening material therewith, said hardening composition having a magnesian mineral or minerals, terra-alba, ozocerite and lake-pitch asphalt or Trinidad asphalt.

8. A composition for street-paving and analogous purposes, having, in combination, natural sandstone asphalt-rock, or other natural asphalt, a magnesian mineral or minerals, terra-alba, and ozocerite.

9. The herein-described composition for street-paving and analogous purposes, consisting of natural sandstone asphalt-rock, or other natural asphalt, steatite or talc, terra-alba, ozocerite, and lake-pitch asphalt or Trinidad asphalt.

In testimony whereof we affix our signatures in presence of two witnesses.

CHARLES R. LONG.
JOHN S. MILLER.
WILLIAM F. INGRAM.

Witnesses:
JNO. R. C. LONG,
JNO. W. SCHORR.